United States Patent
Park

(10) Patent No.: US 12,376,158 B1
(45) Date of Patent: Jul. 29, 2025

(54) METHOD AND APPARATUS FOR SMALL DATA TRANSMISSION

(71) Applicant: Metapex Inc., Seoul (KR)

(72) Inventor: DaeHeum Park, Suwon-si (KR)

(73) Assignee: Metapex Inc., Seoul (KR)

( * ) Notice: Subject to any disclaimer, the term of this patent is extended or adjusted under 35 U.S.C. 154(b) by 0 days.

(21) Appl. No.: 19/088,028

(22) Filed: Mar. 24, 2025

(30) Foreign Application Priority Data

Mar. 29, 2024 (KR) .................. 10-2024-0043655

(51) Int. Cl.
*H04W 74/0833* (2024.01)
*H04W 76/19* (2018.01)
*H04W 76/20* (2018.01)

(52) U.S. Cl.
CPC ......... *H04W 74/085* (2013.01); *H04W 76/19* (2018.02); *H04W 76/20* (2018.02)

(58) Field of Classification Search
CPC .... H04W 74/085; H04W 76/19; H04W 76/20
See application file for complete search history.

(56) References Cited

U.S. PATENT DOCUMENTS

| | | | |
|---|---|---|---|
| 2023/0121314 A1* | 4/2023 | Tsai .................. | H04W 8/22 370/328 |
| 2023/0217532 A1* | 7/2023 | Kim ................. | H04W 74/0833 455/458 |
| 2024/0032134 A1* | 1/2024 | Kim .................. | H04W 76/20 |
| 2024/0049296 A1* | 2/2024 | Agiwal ............. | H04W 72/231 |
| 2024/0107615 A1* | 3/2024 | Kim .................. | H04W 68/02 |
| 2024/0107616 A1* | 3/2024 | Kim .................. | H04W 76/15 |
| 2024/0196444 A1* | 6/2024 | Shah ................ | H04W 76/27 |
| 2024/0276470 A1* | 8/2024 | Zhang ............... | H04W 72/52 |
| 2024/0334527 A1* | 10/2024 | Turtinen ........... | H04B 7/06952 |
| 2024/0334541 A1* | 10/2024 | Wang ................ | H04W 76/19 |
| 2024/0381474 A1* | 11/2024 | Mahendra .......... | H04W 76/20 |
| 2025/0039871 A1* | 1/2025 | Wu .................. | H04W 76/27 |
| 2025/0048474 A1* | 2/2025 | Kim .................. | H04W 76/30 |
| 2025/0048475 A1* | 2/2025 | Kim .................. | H04W 76/30 |
| 2025/0089119 A1* | 3/2025 | Wu .................. | H04W 76/20 |
| 2025/0142658 A1* | 5/2025 | Wang ................ | H04W 76/19 |

* cited by examiner

*Primary Examiner* — Will W Lin
(74) *Attorney, Agent, or Firm* — Bridgeway IP Law Group, PLLC; Jihun Kim

(57) ABSTRACT

Provided are a method and apparatus for small data transmission in a wireless communication system. A terminal may initiate a small data transmission (SDT) procedure. The terminal may perform a first random access (RA) procedure, while the initiated SDT procedure is ongoing and the first RA procedure is triggered by uplink data arrival. The first RA procedure may be performed using first random access channel (RACH) resources, and the first RACH resources are not configured for SDT.

8 Claims, 7 Drawing Sheets

METHOD AND APPARATUS FOR SMALL DATA TRANSMISSION

CROSS-REFERENCE TO RELATED APPLICATIONS

This application claims the priority of Korean Patent Application No. 10-2024-0043655 filed on Mar. 29, 2024, in the Korean Intellectual Property Office, the disclosure of which is incorporated herein by reference.

BACKGROUND OF THE DISCLOSURE

Field of the Disclosure

The present disclosure relates to a wireless communication system applicable to 4G, 5G and 6G.

Related Art

With the success of long-term evolution (LTE)/LTE-A (LTE-Advanced) for the 4th generation mobile communication, the next generation mobile communication (e.g., 5th generation: also known as 5G mobile communication) has been commercialized and the follow-up studies are also ongoing.

The 5th generation mobile communications, as defined by the International Telecommunication Union (ITU), provide a data transmission rate of up to 20 Gbps and a minimum actual transmission rate of at least 100 Mbps anywhere. The official name of the 5th generation mobile telecommunications is 'IMT-2020'. A new radio access technology, known as new RAT or NR, may be introduced for such 5G mobile communication.

The 5G mobile communication supports a plurality of numerologies or subcarrier spacing (SCS) for supporting various services. For example, when the SCS is 15 kHz, a wide area over conventional cellular bands is supported; in the case of 30 kHz/60 kHz, a dense urban area, lower latency, and wider carrier bandwidth is supported; and when the SCS is larger than 60 kHz or higher, bandwidth larger than 24.25 GHz is supported to overcome phase noise.

The NR frequency band is defined by two types (FR1, FR2) of frequency ranges. The FR1 ranges from 410 MHz to 7125 MHz, and the FR2 ranges from 24250 MHz to 52600 MHz, which may correspond to the millimeter wave (mmW) range.

For the convenience of descriptions, in the frequency range used for the NR system, the FR1 may indicate the "sub-6 GHz range" while the FR2 may indicate the "above 6 GHz range" and may be referred to as the millimeter wave (mmW).

As described above, the numerical values of the frequency ranges in the NR system may be changed. For example, the FR1 may include a frequency band ranging from 410 MHz to 7125 MHz as shown in Table 1. In other words, the FR1 may include a frequency band higher than 6 GHz (or 5850, 5900, or 5925 MHz). For example, a frequency band higher than 6 GHz (or 5850, 5900, or 5925 MHz) included in the FR1 may include the unlicensed band. The unlicensed band may be utilized for various applications, which may include communication for vehicles (for example, autonomous driving).

TABLE 1

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

ITU proposes three usage scenarios: enhanced Mobile Broadband (eMBB), massive Machine Type Communication (mMTC) and Ultra Reliable and Low Latency Communications (URLLC).

URLLC is a usage scenario requiring high reliability and low latency. For example, services such as automatic driving, factory automation, augmented reality require high reliability and low latency (e.g., a delay time of less than 1 ms). The delay time of current 4G (e.g., LTE) is statistically about 21 to 43 ms (best 10%) and about 33 to 75 ms (median), which insufficient to support services requiring a delay time of about 1 ms or less. Meanwhile, eMBB is a usage scenario that requires mobile ultra-wideband.

That is, the 5G mobile communication system offers a higher capacity compared to current 4G LTE. The 5G mobile communication system may be designed to increase the density of mobile broadband users and support device to device (D2D), high stability, and machine type communication (MTC). 5G research and development focus on achieving lower latency times and lower battery consumption compared to 4G mobile communication systems, enhancing the implementation of the Internet of things (IoTs).

SUMMARY OF THE DISCLOSURE

The disclosure is to provide a method and apparatus which can efficiently perform small data transmission (SDT) procedure in a wireless communication system.

According to an embodiment, a method of a terminal may be provided for operating in a wireless communication system. The method of the terminal may include initiating a small data transmission (SDT) procedure. The method of the terminal may further include performing a first random access (RA) procedure, while the initiated SDT procedure is ongoing and the first RA procedure is triggered by uplink data arrival. The first RA procedure may be performed using first random access channel (RACH) resources, and the first RACH resources are not configured for SDT.

According to another embodiment, a terminal may be provided for operating in a wireless communication system. The terminal may include a processor configured to cause the terminal to initiate a small data transmission (SDT) procedure. The processor further configured to cause the terminal to perform a first random access (RA) procedure, while the initiated SDT procedure is ongoing and the first RA procedure is triggered by uplink data arrival. The first RA procedure may be performed using first random access channel (RACH) resources, and the first RACH resources are not configured for SDT.

The initiated SDT procedure may be associated with a second RA procedure, and the terminal may configure a prohibit timer for the second RA procedure.

The prohibit timer may be used to avoid frequent triggering of the second RA procedure due to beam failure recovery. The second RA procedure may be initiated when the prohibit timer is not running. The prohibit timer may be configured through a system information block 1 (SIB1).

The prohibit timer may be configured by one of values consisting of 50 milliseconds (ms), 100 ms, 200 ms, 500 ms, 1000 ms, 1500 ms, 2000 ms and 3000 ms.

Meanwhile, the terminal may receive information indicating second RACH resources applicable to the second RA procedure.

DESCRIPTION OF EXEMPLARY EMBODIMENTS

Figure 1:
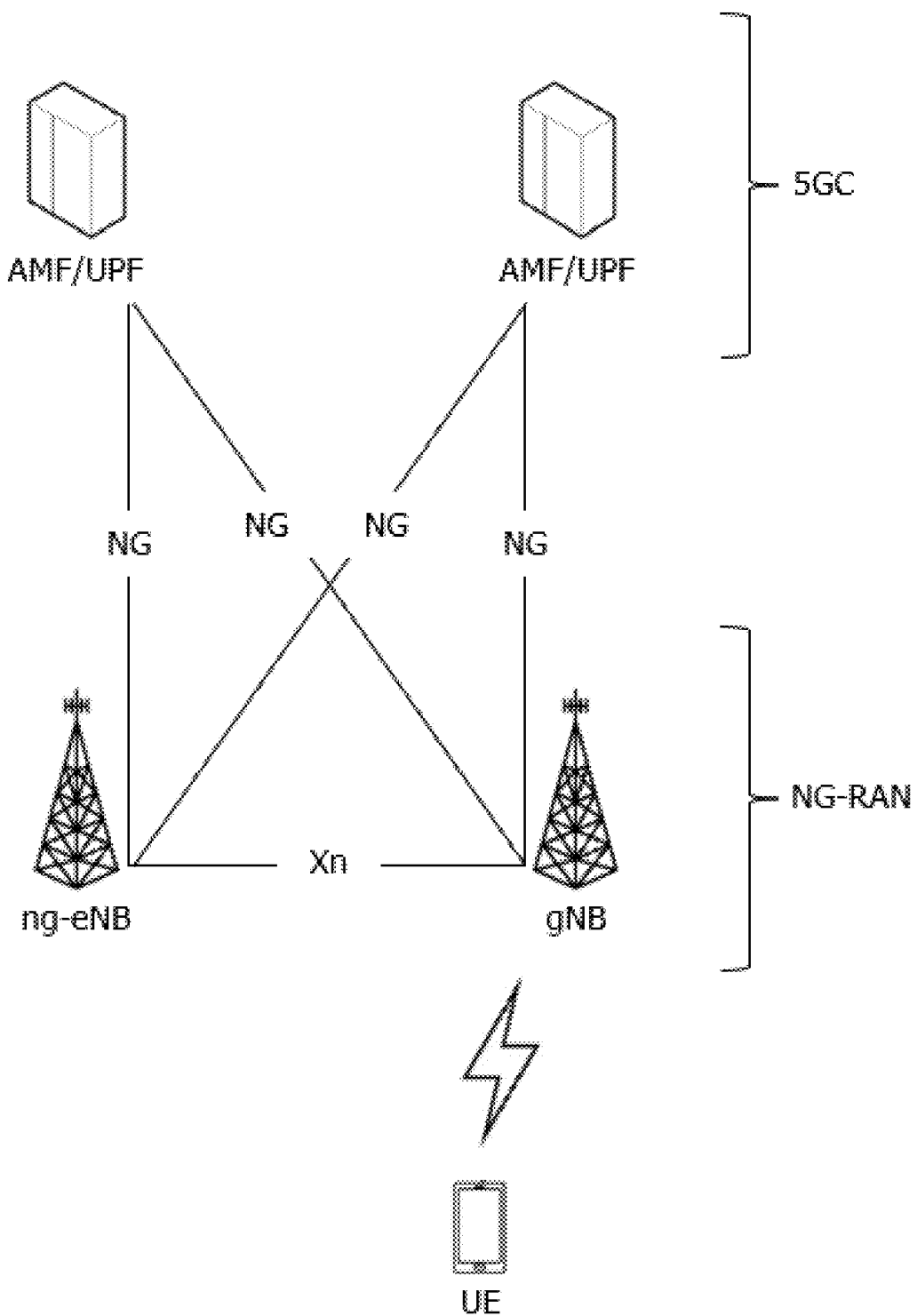
FIG. 1 illustrates a wireless communication system.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

The expression "A or B" as used in the present disclosure may mean "only A", "only B" or "both A and B". In other words, "A or B" may be interpreted as "A and/or B" in the present disclosure. For example, in the present disclosure, "A, B or C" may mean "only A", "only B", "only C" or "any combination of A, B and C".

A slash (/) or a comma used in the present disclosure may mean "and/or". For example, "A/B" may mean "A and/or B". Accordingly, "A/B" may mean "only A", "only B", or "both A and B". For example, "A, B, C" may mean "A, B or C".

The phrase "at least one of A and B" as used in the present disclosure may mean "only A", "only B", or "both A and B". Also, the expression "at least one of A or B" or "at least one of A and/or B" may be interpreted to be the same as "at least one of A and B".

Also, the phrase "at least one of A, B and C" as used in the present disclosure may mean "only A", "only B", or "any combination of A, B and C". Also, the phrase "at least one of A, B or C" or "at least one of A, B and/or C" may mean "at least one of A, B and C".

Also, parentheses used in the present disclosure may mean "for example". More specifically, a phrase is written as "control information (PDCCH)", it may mean that "PDCCH" is proposed as one example of "control information". In other words, "control information" of the present disclosure is not limited to "PDCCH", but it may be interpreted that "PDCCH" is proposed as one example of "control information". Also, when a phrase is written as "control information (namely, PDCCH)", it may be interpreted that "PDCCH" is proposed as one example of "control information".

Technical features described individually in one figure of the present disclosure may be implemented separately or simultaneously.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

FIG. 1 illustrates a wireless communication system.

Referring to FIG. 1, the wireless communication system may be classified into a 5G core network (5GC) and a next generation-radio access network (NG-RAN), and the NG-RAN may include a base station (gNB and/or ng-eNB) that provides user plane and control plane protocol termination to a terminal (user equipment, UE). A next generation-Node B (gNB) provides an NR user plane and control plane protocol termination to the terminal, and a next generation-evolved node B (ng-eNB) provides an evolved-universal terrestrial radio access (E-UTRA) user plane and control plane protocol termination to the terminal (UE). The terminal (UE) may be fixed or mobile, and may be referred to as another term such as a mobile station (MS), a user terminal (UT), a subscriber station (SS), a mobile terminal (MT), a wireless device, etc. The base station (gNB and/or ng-eNB) may be a fixed station communicating with the terminal (UE), and may be referred to as another term such as a base transceiver system (BTS), an access point, etc.

The base station (gNB and/or ng-eNB) may be connected to each other through an Xn interface, and may be connected to a 5G core network (5GC) through an NG interface. Specifically, the base station (gNB and/or ng-eNB) may be connected to an access and mobility management function (AMF) through an NG-C interface, and may be connected to a user plane function (UPF) through an NG-U interface.

Figure 2:
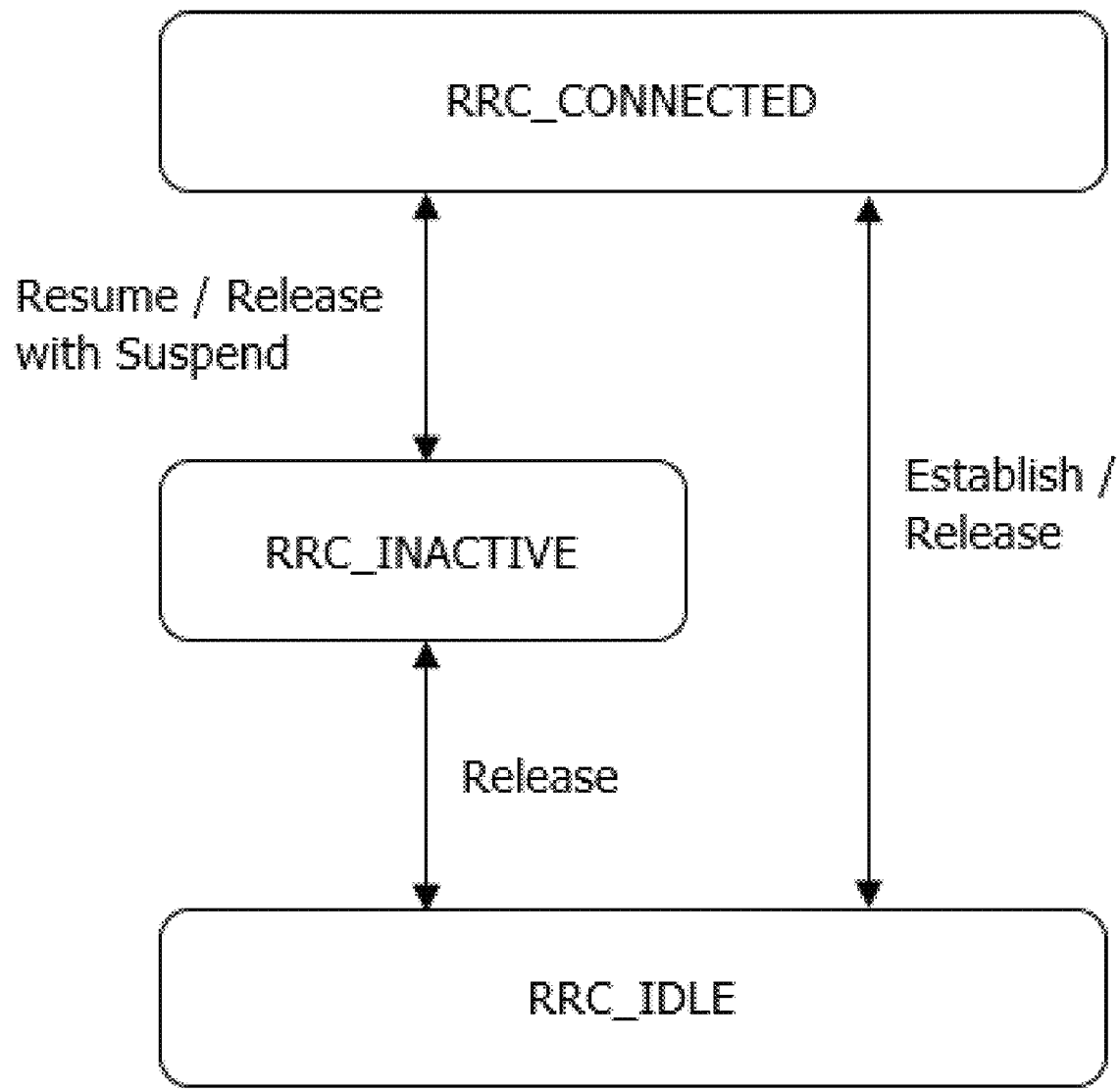
FIG. 2 illustrates UE state machine and state transitions in NR.

FIG. 2 illustrates UE state machine and state transitions in NR.

A UE is either in RRC_CONNECTED state or in RRC_INACTIVE state when an RRC connection has been established. If this is not the case, i.e. no RRC connection is established, the UE is in RRC_IDLE state. The RRC states can further be characterised as follows:

1. RRC_IDLE:
    A UE specific DRX (Discontinuous Reception) may be configured by upper layers;
    At lower layers, the ULE may be configured with a DRX for PTM (Point to Multipoint) transmission of MBS (Multicast/Broadcast Services) broadcast;
    UE controlled mobility based on network configuration;
The UE:
    i) Monitors Short Messages transmitted with P-RNTI (Paging-RNTI) over DCI (Downlink Control Information);
    ii) Monitors a Paging channel for CN(Core Network) paging using 5G-S-TMSI (5G-Serving-Temporary Mobile Subscriber Identity), except if the UE is acting as a L2 (Layer 2) U2N (UE-to-Network) Remote UE;
    iii) If configured by upper layers for MBS multicast reception, monitors a Paging channel for CN paging using TMGI (Temporary Mobile Group Identity);
    iv) Performs neighbouring cell measurements and cell (re-)selection;
    v) Performs measurements on L2 U2N Relay UEs and relay (re-)selection;
    vi) Acquires system information and can send SI request (if configured);
    vii) Performs logging of available measurements together with location and time for logged measurement configured UEs;
    viii) Performs idle/inactive measurements for idle/inactive measurement configured UEs;
    ix) If configured by upper layers for MBS broadcast reception, acquires MCCH change notification and MBS broadcast control information and data.

2. RRC_INACTIVE:
    A UE specific DRX may be configured by upper layers or by RRC layer;
    At lower layers, the UE may be configured with a DRX for PTM transmission of MBS broadcast and/or a DRX for PTM transmission of MBS multicast;
    UE controlled mobility based on network configuration;
    The UE stores the UE Inactive AS (Access Stratum) context;
    A RAN-based notification area is configured by RRC layer;
    Transfer of unicast data and/or signalling to/from UE over radio bearers configured for SDT.
The UE:
    i) Monitors Short Messages transmitted with P-RNTI over DCI;
    ii) While T319a is running, monitors control channels associated with the shared data channel to determine if data is scheduled for it;
    iii) While T319a is not running, monitors a Paging channel for CN paging using 5G-S-TMSI and RAN paging using fullI-RNTI (full Inactive RNTI), except if the UE is acting as a L2 U2N Remote UE;
    iv) If configured by upper layers for MBS multicast reception, while T319a is not running, monitors a Paging channel for paging using TMGI;
    v) Performs neighbouring cell measurements and cell (re-)selection;
    vi) Performs measurements on L2 U2N Relay UEs and relay (re-)selection;
    vii) Performs RAN-based notification area updates periodically and when moving outside the configured RAN-based notification area;
    viii) Acquires system information and, while SDT (Small Data Transmission) procedure is not ongoing, can send SI (System Information) request (if configured);
    ix) While SDT procedure is not ongoing, performs logging of available measurements together with location and time for logged measurement configured UEs;
    x) While SDT procedure is not ongoing, performs idle/inactive measurements for idle/inactive measurement configured UEs;
    xi) If configured by upper layers for MBS broadcast reception, acquires MCCH (MBS Control Channel) change notification and MBS broadcast control information and data;
    xii) If configured for MBS multicast reception in RRC_INACTIVE, acquires multicast MCCH change notification and MBS multicast control information and data;
    xiii) Transmits SRS(Sounding Reference Signal) for Positioning.

Figure 3:
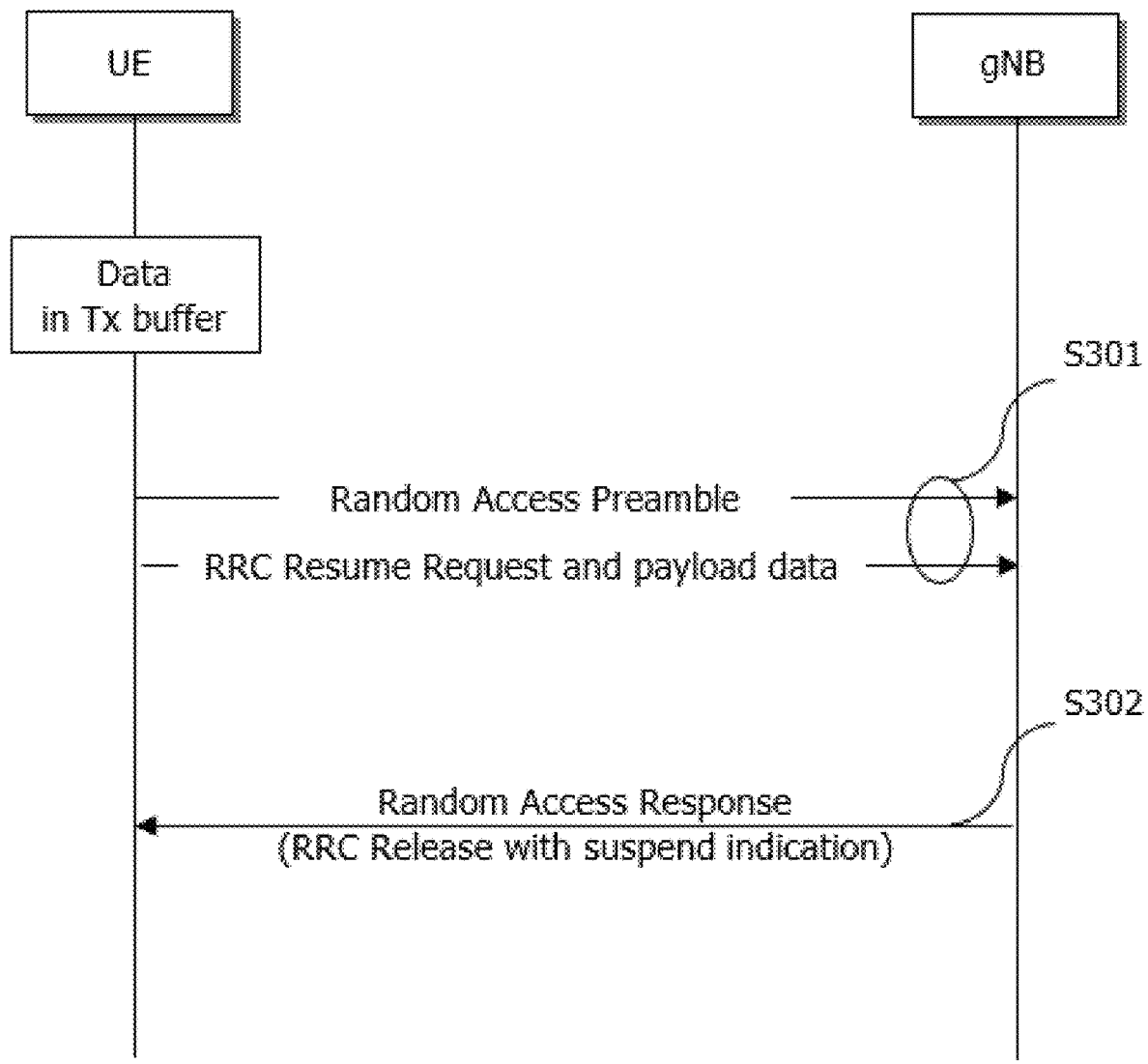
FIG. 3 shows an example of an SDT procedure in NR.

3. RRC_CONNECTED:
    The UE stores the AS context;
    Transfer of unicast data to/from UE;
    Transfer of MBS multicast data to UE;
    At lower layers, the UE may be configured with a UE specific DRX;
    At lower layers, the UE may be configured with a DRX for PTM transmission of MBS broadcast and/or a DRX for MBS multicast;
    At lower layers, the UE may be configured with a cell specific cell DTX/DRX;
    For UEs supporting CA (Carrier Aggregation), use of one or more SCells (Secondary Cells), aggregated with the SpCell (Special Cell), for increased bandwidth;
    For UEs supporting DC (Dual Connectivity), use of one SCG (Secondary Cell Group), aggregated with the MCG (Master Cell Group), for increased bandwidth;
    Network controlled mobility within NR, to/from E-UTRA, and to UTRA-FDD;
    Network controlled mobility (path switch) between a serving cell and a L2 U2N Relay UE, or vice versa, or between a source L2 U2N Relay UE and a target L2 U2N Relay UE;
    Network controlled MP (Multi-Path) operation.
The UE:
    i) Monitors Short Messages transmitted with P-RNTI over DCI, if configured;
    ii) Monitors control channels associated with the shared data channel to determine if data is scheduled for it;
    iii) Provides channel quality and feedback information;
    iv) Performs neighbouring cell and/or L2 U2N relay measurements and measurement reporting;

v) Acquires system information;
vi) Performs immediate MDT measurement together with available location reporting;
vii) If configured by upper layers for MBS broadcast reception, acquires MCCH change notification and MBS broadcast control information and data FIG. 3 shows an example of an SDT procedure in NR.

Small Data Transmission (SDT) is a procedure allowing data and/or signalling transmission while remaining in RRC_INACTIVE state (i.e. without transitioning to RRC_CONNECTED state). SDT is enabled on a radio bearer basis and can be initiated either by the UE in case of MO-SDT (Mobile Originated-SDT) or by the network in case of MT-SDT (Mobile Terminated-SDT). MO-SDT is initiated by the UE only if less than or equal to a configured amount of uplink (UL) data awaits transmission across all radio bearers for which SDT is enabled, the downlink (DL) RSRP (Reference Signal Received Power) is above a configured threshold, and a valid SDT resource is available. MT-SDT is initiated by the network with an indication to the UE in a paging message when DL data awaits transmission for radio bearers configured for SDT. Based on the indication, the UE initiates the MT-SDT only if the DL RSRP is above a configured threshold. When MT-SDT is initiated by the UE, a resume cause indicating MT-SDT is included in the RRC Resume Request message. Maximum duration the SDT procedure can last is dictated by a SDT failure detection timer that is configured by the network. Network can enable MO-SDT, MT-SDT, or both in a cell.

SDT procedure is initiated with either a transmission over RACH (configured via system information) or over Type 1 CG (configured grant) resources (configured via dedicated signalling in RRC Release message). The SDT resources can be configured on initial BWP (Bandwidth Part) for both RACH(Random Access Channel) and CG. RACH and CG resources for SDT can be configured on either or both of NUL (Normal Uplink) and SUL (Supplementary Uplink) carriers. The CG resources for SDT are valid only within the Pcell (Primary Cell) of the UE when the RRC Release message with suspend indication is received. CG resources are associated with one or multiple synchronization signal blocks (SSBs). For RACH, the network can configure 2-step and/or 4-step RA (Random Access) resources for MO-SDT. When both 2-step and 4-step RA resources for MO-SDT are configured, the UE selects the RA type. If MT-SDT procedure is initiated over RACH, only the RACH resources not configured for SDT can be used by the UE.

FIG. 3 shows an SDT procedure initiated with a transmission over RACH of 2-step RA. Referring to FIG. 3, when data for SDT is available in a transmission buffer, the UE transmits a random access preamble on PRACH (Physical Random Access Channel) and an RRC Resume Request message and a payload on PUSCH (S301). In response to the transmission, the UE receives a random access response and an RRC Release message with a suspend indication (S302). Upon receiving the response, the UE ends the random access procedure.

Figure 4:
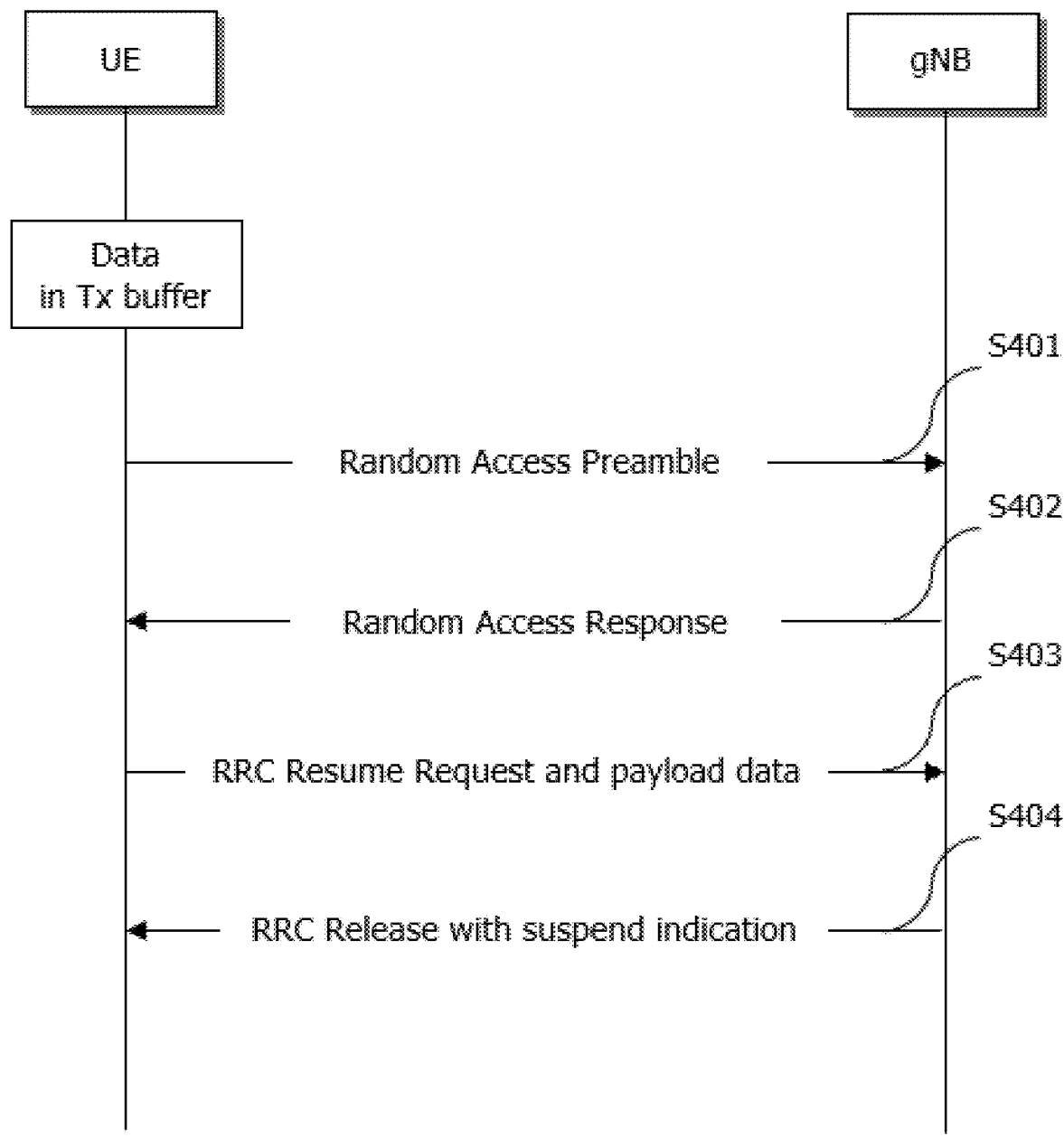
FIG. 4 shows another example of an SDT procedure in NR.

FIG. 4 shows another example of an SDT procedure in NR.

FIG. 4 shows an SDT procedure initiated with a transmission over RACH of 4-step RA. Referring to FIG. 4, when data for SDT is available in a transmission buffer, the UE transmits a random access preamble on PRACH (Physical Random Access Channel) (S401). In response to the transmission, the UE receives a random access response (S402). Upon reception of the random access response, the UE transmits an RRC Resume Request message and a payload on PUSCH using UL grant scheduled in the random access response (S403). After receiving an RRC Release message with a suspend indication (S402), the random access procedure ends.

Figure 5:
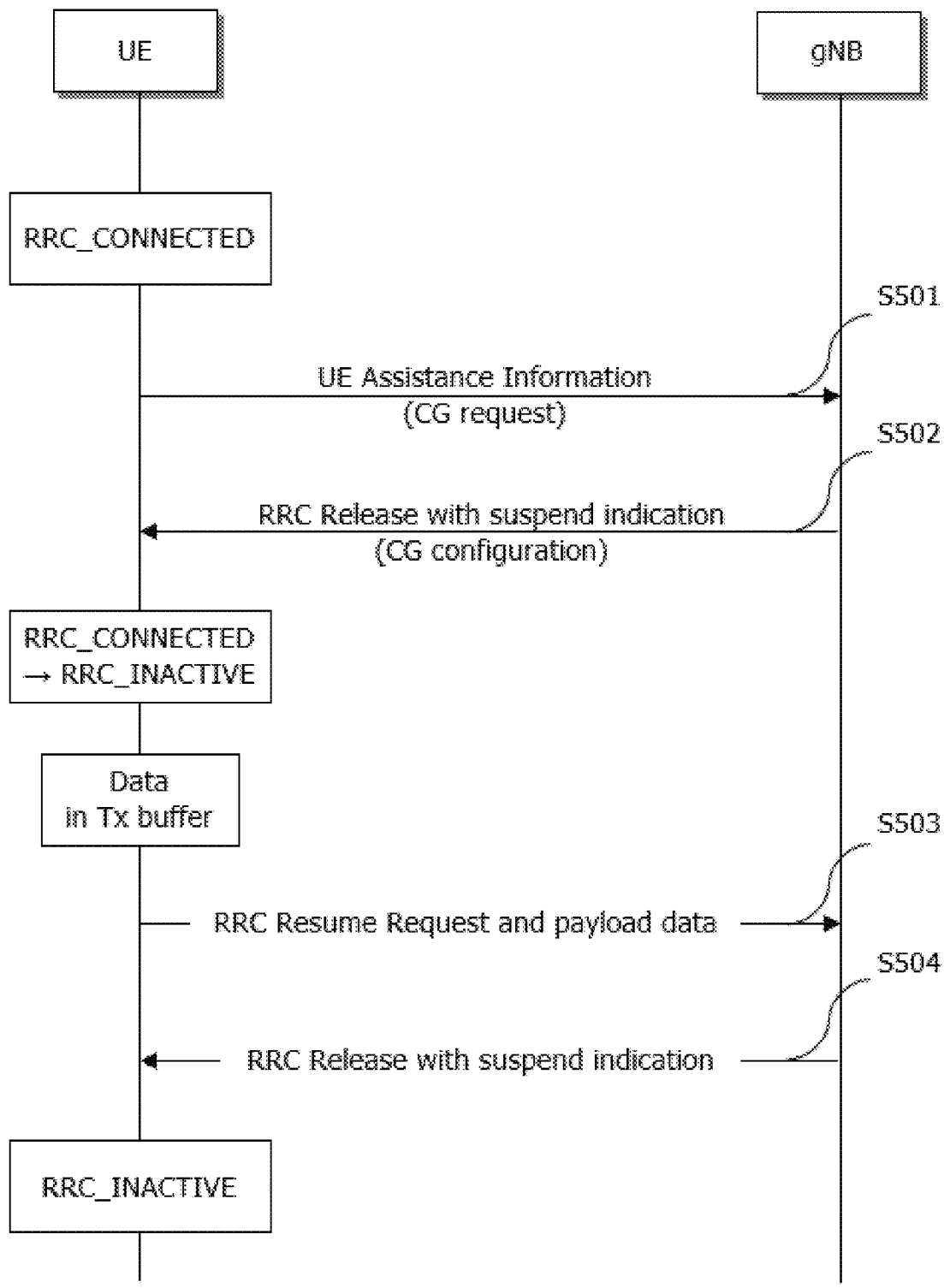
FIG. 5 shows still another example of an SDT procedure in NR.

FIG. 5 shows still another example of an SDT procedure in NR.

FIG. 5 shows an SDT procedure initiated with a transmission over CG (configured grant) resources. The radio resources for SDT are allocated periodically based on the estimation of the UE's traffic requirements. For the SDT procedure over CG, there will be no radio resource collision with other UEs since radio resources are dedicated for each UE. The resource allocation is signalled to the UE by the base station when the UE leaves RRC connected state.

Referring to FIG. 5, the UE transmits a UE Assistance Information message with CG request in RRC connected state (S501). After the transmission of the UE Assistance Information message, the UE receives an RRC Release message with a suspend indication and CG configuration (S502). When UE's protocol transition from the RRC connected state to RRC inactive state happens and data for SDT is available in a transmission buffer, the UE transmits an RRC Resume Request message and a payload on PUSCH using the CG resources (S503). After receiving an RRC Release message with a suspend indication (S504), the UE remains in RRC inactive state.

Meanwhile, the network can associate a set of RACH resources with feature(s) applicable to a Random Access procedure: Network Slicing, (e) RedCap ((enhanced) reduced capability), SDT, and NR coverage enhancement. A set of RACH resources associated with a feature is only valid for random access procedures applicable to at least that feature; and a set of RACH resources associated with several features is only valid for random access procedures having at least all of these features. The UE selects the set(s) of applicable RACH resources, after uplink carrier (i.e. NUL or SUL) and BWP selection and before selecting the RA type.

The UE may initiate RA procedure for SR (scheduling request) due to BSR (buffer status report) trigger while SDT procedure is ongoing. In this case, the RACH resources (or a set of RACH resources) configured for SDT should not be used. In other words, while the SDT procedure is ongoing and RA procedure is triggered (e.g., for SR due to BSR trigger upon UL data arrival), only the RACH resources not configured for SDT can be used by the UE.

Further, if there is a beam failure during ongoing RA-SDT procedure for MO-SDT or MT-SDT (performed over RACH), the transmission and reception at the UE will not succeed and the UE will wait until a SDT failure detection timer expires, and then the UE goes to IDLE state. Instead of the SDT failure detection timer, a new timer is proposed, which is "SDT Beam Failure Recovery Prohibit Timer". During ongoing RA-SDT procedure for MO-SDT or MT-SDT (performed over RACH), if the SDT Beam Failure Recovery Prohibit Timer is not running and if the RSRP value of the current SSB (i.e., SSB selected in the last random access procedure during the ongoing SDT procedure) is less than a pre-configured threshold, a UE triggers RACH procedure. Therefore, if recovered, the UE does not go to IDLE state.

RRC(Radio Resource Control) may configure the parameter of SDT Beam Failure Recovery Prohibit Timer. That is, SDT Beam Failure Recovery Prohibit Timer may be configured through a system information block 1 (SIB1) as shown in Table 2.

TABLE 2

```
-- ASN1START
-- TAG-SIB1-START
...
SIB1-v1800-IEs ::=           SEQUENCE {
...
    sdt-BeamFailureRecoveryProhibitTimer-r18
ENUMERATED {ms50,
ms100, ms200, ms500, ms1000, ms1500, ms2000, ms3000}
...
-- TAG-SIB1-STOP
-- ASN1STOP
```

The prohibit timer is used to avoid frequent triggering of Random Access (RA) procedure due to beam failure recovery during RA-SDT procedure or during MT-SDT procedure initiated by RA procedure. The value of the prohibit timer is used for RACH for beam failure indication during SDT. Value ms50 corresponds to 50 milliseconds, value ms100 corresponds to 100 milliseconds and so on.

The prohibit timer may be configured independently for RA-SDT and MT-SDT. That is, a first prohibit timer may be RA-SDT Beam Failure Recovery Prohibit Timer and a second prohibit timer may be MT-SDT Beam Failure Recovery Prohibit Timer.

RRC may configure the parameters of RA-SDT Beam Failure Recovery Prohibit Timer and MT-SDT Beam Failure Recovery Prohibit Timer separately through SIB1 as shown in Table 3.

TABLE 3

```
-- ASN1START
-- TAG-SIB1-START
...
SIB1-v1800-IEs ::=           SEQUENCE {
...
    ra-sdt-BeamFailureRecoveryProhibitTimer-r18   ENUMERATED
{ms50, ms100, ms200, ms500, ms1000, ms1500, ms2000, ms3000}
    mt-sdt-BeamFailureRecoveryProhibitTimer-r18   ENUMERATED
{ms50, ms150, ms300, ms600, ms1000, ms1500, ms2250, ms3000}
...
-- TAG-SIB1-STOP
-- ASN1STOP
```

The MAC (Medium Access Control) entity (of the UE) may be configured by RRC with SDT and the SDT procedure may be initiated by RRC layer for MO-SDT or MT-SDT. For MO-SDT or MT-SDT, the parameter of (RA or MT) SDT Beam Failure Recovery Prohibit Timer may be configured through the SIB1.

Figure 6:
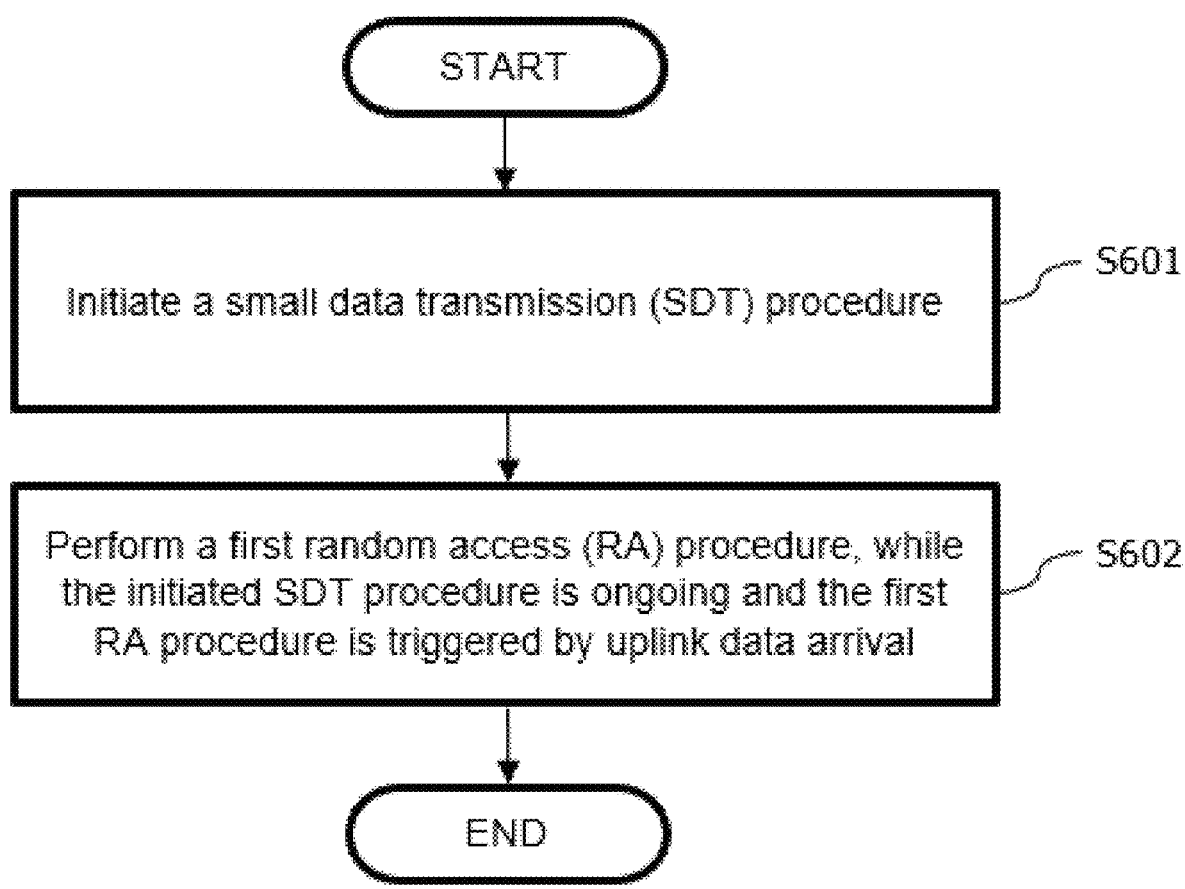
FIG. 6 is a flowchart showing a method of operating a terminal (UE) according to an embodiment of the disclosure.

FIG. 6 is a flowchart showing a method of operating a terminal (UE) according to an embodiment of the disclosure.

Referring to FIG. 6, The terminal initiates a small data transmission (SDT) procedure (S601). The terminal performs a first random access (RA) procedure, while the initiated SDT procedure is ongoing and the first RA procedure is triggered by uplink data arrival (S602). The first RA procedure may be performed using first random access channel (RACH) resources, and the first RACH resources are not configured for SDT.

The initiated SDT procedure may be associated with a second RA procedure, and the terminal may configure a prohibit timer for the second RA procedure.

The prohibit timer may be used to avoid frequent triggering of the second RA procedure due to beam failure recovery. The second RA procedure may be initiated when the prohibit timer is not running. The prohibit timer may be configured through a system information block 1 (SIB1).

The prohibit timer may be configured by one of values consisting of 50 milliseconds (ms), 100 ms, 200 ms, 500 ms, 1000 ms, 1500 ms, 2000 ms and 3000 ms.

Meanwhile, the terminal may receive information indicating second RACH resources applicable to the second RA procedure.

The prohibit timer may be configured independently for RA-SDT and MT-SDT. A first prohibit timer for RA-SDT may be configured by one of values consisting of 50 milliseconds (ms), 100 ms, 200 ms, 500 ms, 1000 ms, 1500 ms, 2000 ms and 3000 ms. A second prohibit timer for MT-SDT may be configured by one of values consisting of 50 milliseconds (ms), 150 ms, 300 ms, 600 ms, 1000 ms, 1500 ms, 2250 ms and 3000 ms.

The disclosure described so far may be implemented through various means. For example, the embodiment may be implemented by hardware, firmware, software, or a combination thereof. Specifically, the implementation will be described below with reference to the accompanying drawing.

Figure 7:
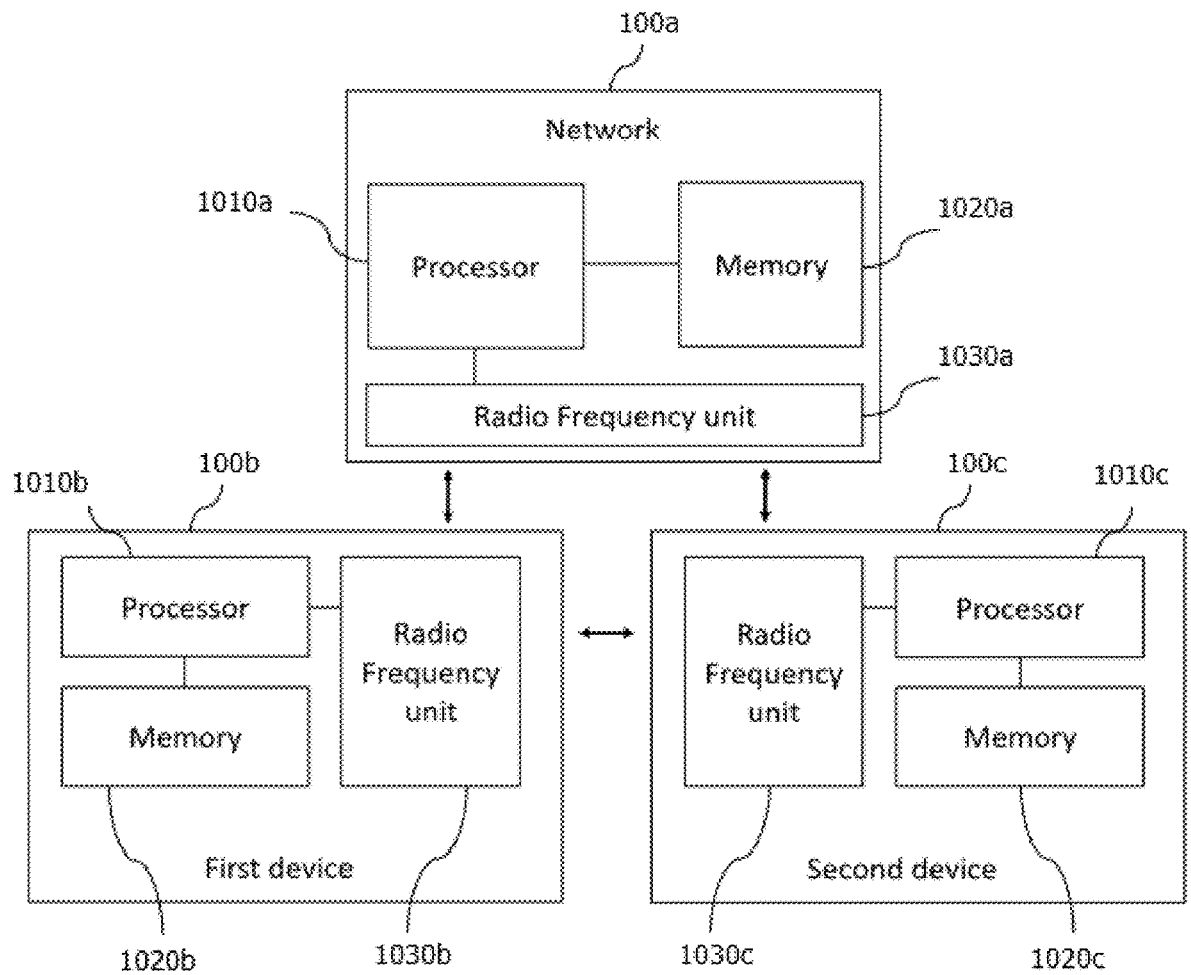
FIG. 7 is a block diagram showing apparatuses according to an embodiment of the disclosure.

FIG. 7 is a block diagram showing apparatuses according to an embodiment of the disclosure.

Referring to FIG. 7, a wireless communication system may include a network 100a, a first apparatus 100b and a second apparatus 100c.

The network 100a may include a base station, a network node, an apparatus related to 5G service, or other apparatuses related to the fourth industrial revolution.

The first device 100b may include a transmission terminal, a reception terminal, a wireless apparatus, a radio communication device, a vehicle, a vehicle with an autonomous driving function, a connected car, an unmanned aerial vehicle (UAV), an artificial intelligence (AI) module, a robot, an augmented reality (AR) apparatus, a virtual reality (VR) apparatus, a mixed reality (MR) apparatus, a hologram apparatus, a public safety apparatus, a machine-type communication (MTC) apparatus, an Internet of things (IoT) apparatus, a medial apparatus, a finance technology (FinTech) apparatus (or a financial apparatus), a security apparatus, a climate/environment apparatus, an apparatus related to a 5G service, or other apparatuses related to the fourth industrial revolution.

The second device 100c may include a transmission terminal, a reception terminal, a wireless apparatus, a radio communication device, a vehicle, a vehicle with an autonomous driving function, a connected car, an unmanned aerial vehicle (UAV), an artificial intelligence (AI) module, a robot, an augmented reality (AR) apparatus, a virtual reality (VR) apparatus, a mixed reality (MR) apparatus, a hologram apparatus, a public safety apparatus, a machine-type communication (MTC) apparatus, an Internet of things (IoT) apparatus, a medial apparatus, a finance technology (FinTech) apparatus (or a financial apparatus), a security apparatus, a climate/environment apparatus, an apparatus related to a 5G service, or other apparatuses related to the fourth industrial revolution.

The network 100a may include at least one processor such as a processor 1010a, at least one memory such as a memory 1020a and at least one radio frequency unit such as a radio frequency unit 1030a. The processor 1010a may be tasked with executing the previously mentioned functions, procedures, and/or methods. The processor 1010a may be capable of implementing one or more protocols. For example, the processor 1010a may perform and manage one or more layers of a radio interface protocol. The memory 1020a may be connected to the processor 1010a, and configured to store various types of information and/or instructions. The radio frequency unit 1030a may be connected to the processor 1010a, and controlled to transceive radio signals.

The first device 100b may include at least one processor such as a processor 1010b, at least one memory such as a memory 1020b and at least one radio frequency unit such as a radio frequency unit 1030b. The processor 1010b may be tasked with executing the previously mentioned functions, procedures, and/or methods. The processor 1010b may be capable of implementing one or more protocols. For example, the processor 1010b may perform and manage one or more layers of a radio interface protocol. The memory 1020b may be connected to the processor 1010b, and configured to store various types of information and/or instructions. The radio frequency unit 1030b may be connected to the processor 1010b, and controlled to transceive radio signals.

The second device 100c may include at least one processor such as a processor 1010c, at least one memory such as a memory 1020c and at least one radio frequency unit such as a radio frequency unit 1030c. The processor 1010c may be tasked with executing the previously mentioned functions, procedures, and/or methods. The processor 1010c may be capable of implementing one or more protocols. For example, the processor 1010c may perform and manage one or more layers of a radio interface protocol. The memory 1020c may be connected to the processor 1010c, and configured to store various types of information and/or instructions. The radio frequency unit 1030c may be connected to the processor 1010c, and controlled to transceive radio signals.

The memory 1020a, the memory 1020b and/or the memory 1020c may be respectively connected inside or outside the processor 1010a, the processor 1010b and/or the processor 1010c and connected to other processors through various technologies such as wired or wireless connection.

According to the embodiment of the disclosure, small data transmission (SDT) procedure may be efficiently performed in a wireless communication system.

Although the preferred embodiments of the disclosure have been illustratively described, the scope of the disclosure is not limited to only the specific embodiments, and the disclosure can be modified, changed, or improved in various forms within the spirit of the disclosure and within a category written in the claim.

In the above exemplary systems, although the methods have been described in the form of a series of steps or blocks, the disclosure is not limited to the sequence of the steps, and some of the steps may be performed in different order from other or may be performed simultaneously with other steps. Further, those skilled in the art will understand that the steps shown in the flowcharts are not exclusive and may include other steps or one or more steps of the flowcharts may be deleted without affecting the scope of the disclosure.

Claims of the present disclosure may be combined in various manners. For example, technical features of the method claim of the present disclosure may be combined to implement a device, and technical features of the device claim of the present disclosure may be combined to implement a method. In addition, the technical features of the method claim and the technical features of the device claim of the present disclosure may be combined to implement a device, and technical features of the method claim and the technical features of the device claim of the present disclosure may be combined to implement a method.

What is claimed is:

1. A method of operating a terminal in a wireless communication system, the method comprising:
   initiating a small data transmission (SDT) procedure; and
   performing a first random access (RA) procedure while the initiated SDT procedure is ongoing and the first RA procedure is triggered by uplink data arrival,
   wherein the first RA procedure is performed using first random access channel (RACH) resources,
   wherein the initiated SDT procedure is associated with a second RA procedure,
   wherein the second RA procedure is initiated when a prohibit timer is configured and not running,
   wherein the prohibit timer is used to avoid frequent triggering of the second RA procedure due to beam failure recovery, and
   wherein the prohibit timer is configured by one value in a set comprising 50 milliseconds (ms), 100 ms, 200 ms, 500 ms, 1000 ms, 1500 ms, 2000 ms and 3000 ms.

2. The method of claim 1, wherein the prohibit timer is configured through a system information block 1 (SIB1).

3. The method of claim 1, further comprising:
   receiving information indicating second RACH resources applicable to the second RA procedure.

4. The method of claim 1, wherein the first RACH resources are not configured for SDT.

5. A terminal in a wireless communication system comprising:
   a processor configured to cause the terminal to:
   initiate a small data transmission (SDT) procedure; and
   perform a first random access (RA) procedure, while the initiated SDT procedure is ongoing and the first RA procedure is triggered by uplink data arrival,
   wherein the first RA procedure is performed using first random access channel (RACH) resources, and
   wherein the initiated SDT procedure is associated with a second RA procedure,
   wherein the second RA procedure is initiated when a prohibit timer is configured and not running,
   wherein the prohibit timer is used to avoid frequent triggering of the second RA procedure due to beam failure recovery, and
   wherein the prohibit timer is configured by one value in a set comprising 50 milliseconds (ms), 100 ms, 200 ms, 500 ms, 1000 ms, 1500 ms, 2000 ms and 3000 ms.

6. The terminal of claim 5, wherein the prohibit timer is configured through a system information block 1 (SIB1).

7. The terminal of claim 5, wherein the processor is further configured to cause the terminal to:
   receive information indicating second RACH resources applicable to the second RA procedure.

8. The terminal of claim 5, wherein the first RACH resources are not configured for SDT.

* * * * *